(12) United States Patent
Hunter

(10) Patent No.: US 8,721,465 B2
(45) Date of Patent: May 13, 2014

(54) WATER DISPENSING DEVICE

(75) Inventor: Rick Hunter, Ottawa (CA)

(73) Assignee: Proslide Technology Inc., Ottawa, Ontario (CA)

( * ) Notice: Subject to any disclaimer, the term of this patent is extended or adjusted under 35 U.S.C. 154(b) by 234 days.

(21) Appl. No.: 13/187,007

(22) Filed: Jul. 20, 2011

(65) Prior Publication Data

US 2012/0021665 A1  Jan. 26, 2012

Related U.S. Application Data

(60) Provisional application No. 61/367,122, filed on Jul. 23, 2010.

(51) Int. Cl.
*A63G 21/18* (2006.01)
*A63H 23/10* (2006.01)

(52) U.S. Cl.
USPC .......................... 472/117; 472/128; 446/153

(58) Field of Classification Search
USPC ............ 472/13, 116, 117, 128; 446/153, 475
See application file for complete search history.

(56) References Cited

U.S. PATENT DOCUMENTS

| 5,820,471 A | 10/1998 | Briggs |
| 5,839,964 A * | 11/1998 | Rudell et al. ................. 472/117 |
| 6,342,016 B1 * | 1/2002 | Parker ............................ 472/128 |
| 6,454,659 B1 * | 9/2002 | Noble ............................ 472/117 |

* cited by examiner

*Primary Examiner* — Kien Nguyen
(74) *Attorney, Agent, or Firm* — Casimir Jones SC

(57) ABSTRACT

A water dispensing device comprises a container mounted to rotate about an axis. The container is adapted to receive and accumulate quantities of water. The container is pivotal mounted to rotate about the axis such that when the container accumulates more than a predetermined quantity of water, the container is adapted to rotate at least one rotation about the axis to dispense a quantity of water.

18 Claims, 6 Drawing Sheets

WATER DISPENSING DEVICE

CROSS-REFERENCE TO RELATED APPLICATION

The present application claims priority to U.S. Provisional Patent Application No. 61/367,122, filed Jul. 23, 2010, the contents of which are incorporated by reference in its entirety.

FIELD OF THE INVENTION

This disclosure relates to water play structures. In particular, this disclosure relates to a device for a water play structure that accumulates and dispenses water.

BACKGROUND OF THE INVENTION

Water play structures are becoming a popular means for people to cool off in warm weather. The people that participate in water play structures may vary in age from very young to adult. Water play structures can be found in both neighbourhood parks and larger commercial water parks.

Water play structures often incorporate a variety of elements for delivering water to participants. A variety of water elements may increase the entertainment values of the water play structures. These water elements can include misters, sprayers, water guns and other devices that may deliver a continuous or intermittent flow of water.

Other water elements may accumulate and periodically dispense a larger volume of water at once. One such water element is a large tipping bucket. U.S. Pat. No. 5,820,471 discloses a giant tipping bucket for periodically tipping and spilling thousands of gallons of water on participants below.

There is a constant demand for new ways of delivering water to maintain the interest of participants.

SUMMARY OF THE INVENTION

An aspect of the disclosure relates to a water dispensing device comprising: a container mounted to rotate about an axis, the container being adapted to receive and accumulate quantities of water; the container being pivotal mounted to rotate about the axis such that when the container accumulates more than a predetermined quantity of water, the container is adapted to rotate at least one rotation about the axis to dispense a quantity of water.

Another aspect of the disclosure relates to a participatory water play system comprising a water dispensing device, the water dispensing device comprising: a support structure; a container mounted on the support structure to rotate about an axis, the container being adapted to receive and accumulate quantities of water; the container being pivotal mounted to rotate about the axis such that when the container accumulates more than a predetermined quantity of water, the container is adapted to rotate at least one rotation about the axis to dispense a quantity of water.

In some embodiments, a plane including the axis divides the unfilled water dispensing device into a front section having a first volume for accumulating water and a back section having a second volume for accumulating water, wherein the first volume is larger than the second volume, and wherein, as the first volume and the second volume accumulate water, the greater quantity of water in the first volume cause rotation of the device.

In some embodiments, the first volume comprises a main container part and a secondary container part spaced further from the axis than the main container part, and the secondary container part is positioned to accumulate water after the main container part has accumulated an amount of water, and the volume of the secondary container is sufficient to cause the complete rotation of the container when a sufficient amount of water is accumulated in the second container part.

In some embodiments, the container is cylindrical with the axis comprising a longitudinal axis of the cylinder and the secondary container part comprises a lip projecting out of the cylinder.

In some embodiments, the container further comprises a barrier between the main container part and the secondary container part wherein the barrier delays when the secondary container part accumulates water.

In some embodiments, the secondary container part defines openings to allow limited flow of water from the secondary container part during filling to delay a rate at which the secondary container part accumulates water.

In some embodiments, the container comprises a container body which is symmetrical about the plane and the water dispensing device further comprises a blockage wherein a portion of the volume of the container body on the first side of the plane which can be filled with water is less that the portion of the container on the second side of the plane which can be filled with water.

In some embodiments, the lip is semi-cylindrical.

In some embodiments, the opening of the container is sized to enable substantially all of the accumulated water to be dispensed when the water dispensing device rotates.

Some embodiments further comprise a deflector below the container angled to direct at least a portion of the dispensed water.

In some embodiments, the support structure supports the container above the heads of the participants.

In some embodiments, the water is dispensed periodically at 4 to 5 minute intervals.

In some embodiments, a first volume of the container for accumulating water on a first side of a vertical plane including the axis is larger than a second volume of the container for accumulating water on a second side of the vertical plane wherein when the first volume and the second volume accumulate a quantity of water, the greater volume of water in the first volume initiates rotation of the device.

In some embodiments, the first volume comprises a container part projecting from the container.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION OF EMBODIMENTS

Figure 1:
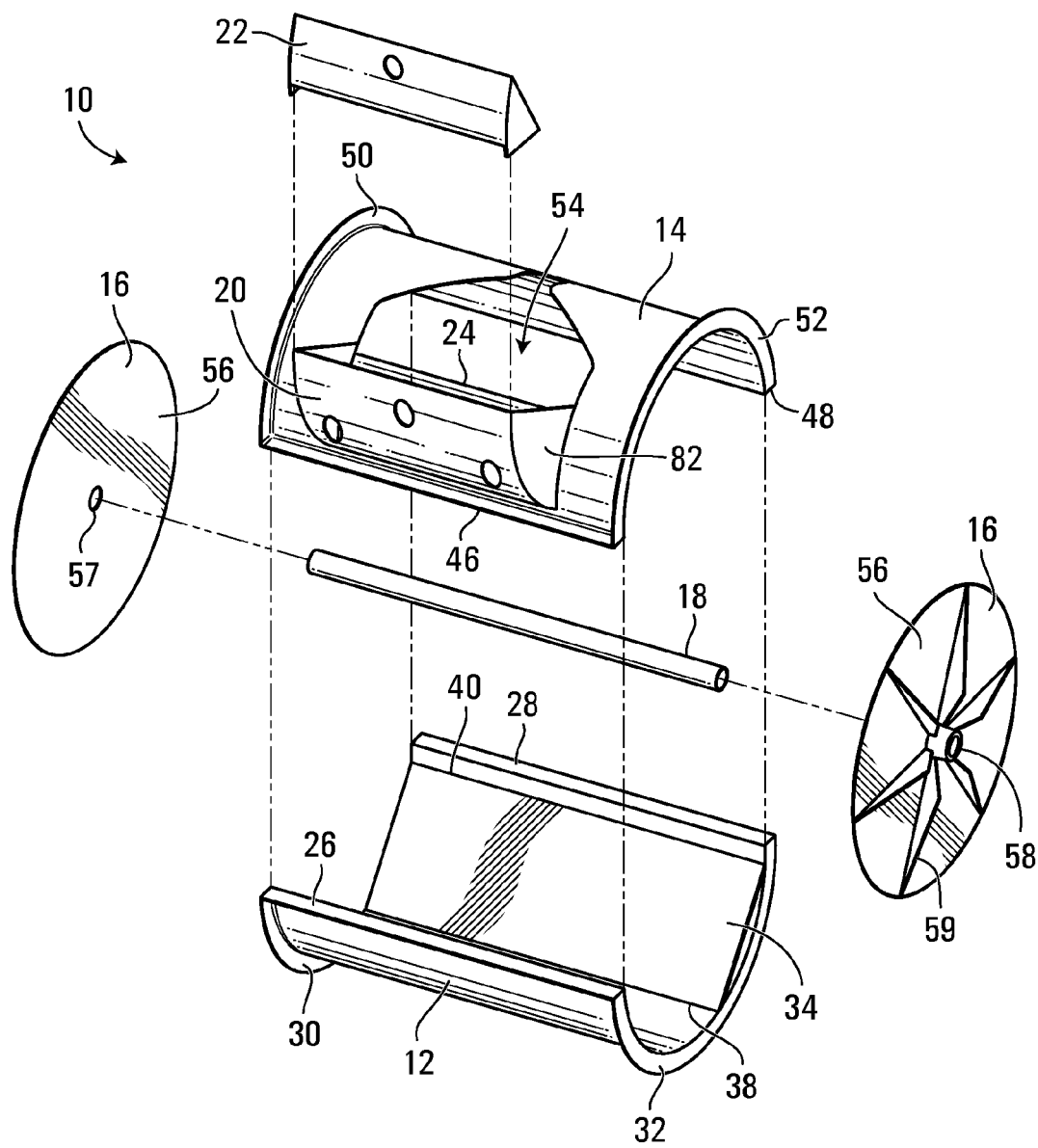
FIG. 1 is an exploded perspective view of a water dispensing device according to an embodiment of the invention.

An embodiment of a water dispensing device 10 for accumulating and periodically dispensing a larger quantity of water is shown in an exploded view in FIG. 1. The water dispensing device 10 comprises a bottom section 12, a top section 14, ends 16, a shaft 18, a lip 20, a lip extension 22, and a weir 24.

In the present embodiment, the bottom section 12 has a semi-circular cross-section and is formed as a half cylinder. The bottom section 12 has a front edge 26 and a back edge 28. The front edge 26 and the back edge 28 extend lengthwise along the half cylinder shape. The bottom section 12 also has a left side edge 30 and a right side edge 32. The left side edge 30 and the right side edge 32 extend around the semicircular ends of the half cylindrical shape. The edges 26, 28, 30 and 32 may be formed with flanges that project outwardly perpendicular to the outside surface of the bottom section 12. The flanges facilitate the connection of the bottom section 12 to the top section 14 and the ends 16. However, the flanges may be omitted depending on how the top section 12, the bottom section 14 and the ends 16 are connected.

Figure 4:
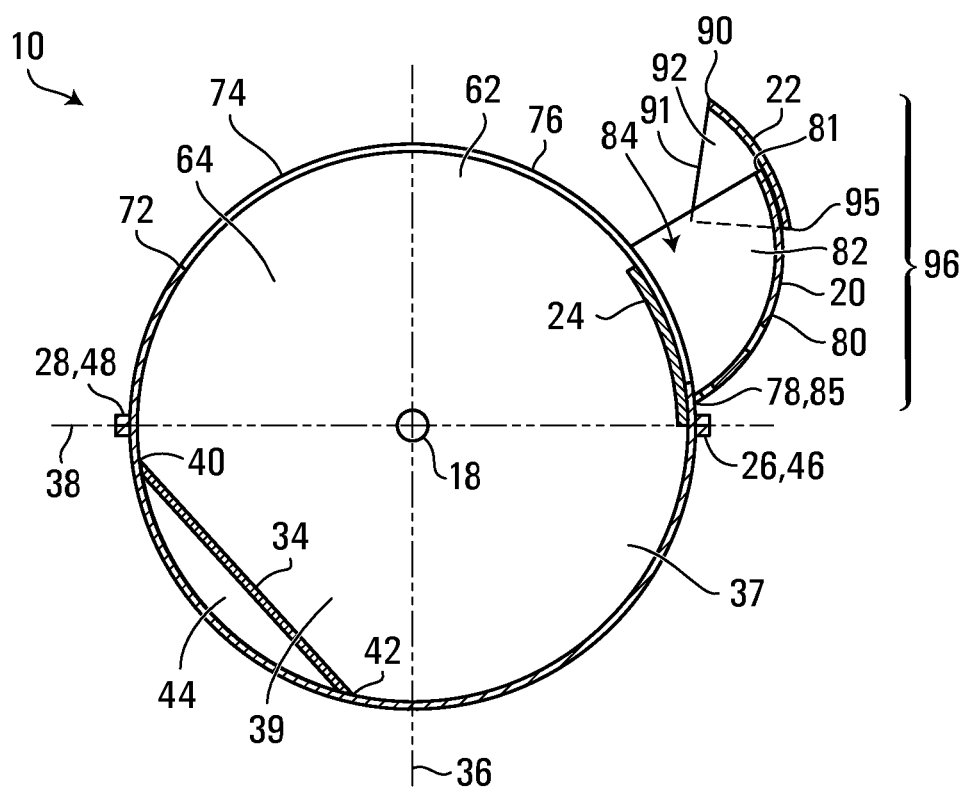
FIG. 4 is a cross-sectional view of the water dispensing device of FIG. 1.

The bottom section 12 also includes a plate 34. The positioning of the plate 34 can best be seen in FIG. 4. In FIG. 4, a plane 36 is marked which is the plane which extends through the shaft 18 and bisects the front section of the water dispensing device 10 from the back section of the water dispensing device 10. Similarly, a plane 38 is marked which is the plane which extends through the shaft 18 and bisects the bottom section from the top section. In the unfilled position, the plane 36 is substantially vertical and the plane 38 is substantially horizontal. These plane are not physical elements but are marked to aid in the description below. A front section 37 of the bottom section 12 is in front of the plane 36 and a back section 39 of the bottom section 12 is behind the plane 36.

The plate 34 is a rectangular flat plate which has a top edge 40 and a bottom edge 42. The plate 34 is connected to the interior of the bottom section 12, for example, by welding or adhesive. In this embodiment, the top edge 40 of the plate 34 and the bottom edge 38 of the plate 34 run parallel to the back edge 28 of the bottom section 12. In this embodiment top edge 40 is spaced downward from the plane 38 and the bottom edge 42 is spaced back from the plane 36. The plate 34 runs the entire length of the bottom section 12.

As can best be seen in FIG. 4, a pocket 44 is defined between the plate 34 and the bottom section 12. The ends of the pocket 44 of this embodiment are blocked by the ends 16 when the water dispensing device 10 is assembled. This means that no water will enter the pocket 44 when water pours into the water dispensing device 10. This will create a weight imbalance as the bottom section 12 fills with water because the volume and therefore the weight of water in front section 37 of the bottom section 12 will be greater than the weight of water in the back section 39 of the bottom section 12. The amount of imbalance can be altered in a number of ways. For example, the size of the plate 34 can be increased or decreased to change the size of the pocket 44. The plate 34 may be non-flat and bulge into the interior of the water dispensing device 10 or be depressed out towards the exterior. The plate 34 or other blockage may extend less than the entire length of the water dispensing device 10.

Although the plate 34 is depicted in the present embodiment as attached to the water dispensing device 10 below the plane 38 and behind the plane 36, it will be understood that the plate 34 may extend beyond these planes.

The pocket 44 may be eliminated, for example, by omitting the portion of the bottom section 12 between the top edge 40 and the bottom edge 42 of the plate 34. The plate 34 may be replaced with multiple plates or other blocking means. The plate 34 may also be eliminated. The bottom section 12 may be formed with a non-cylindrical shape such that the volume of the bottom section 12 behind the plane 36, the back section 39, which can be filled by water is less that the volume of the bottom section 12 in front of the plane 36, the front section 37, which can be filled by water. Counterweights in the front section 37 may be used to alternatively or also contribute to an imbalance.

In another embodiment, the bottom section 12 may maintain its cylindrical shape which is symmetrical about the plane 36. Instead, an imbalance may be created by other means such as the addition of weights to the front section 37.

Also, the bottom section 12 may have no imbalance and an imbalance may be created only in the top section 14 as discussed further below.

Turning to the top section 14, the top section 14 is also shown in FIG. 1 as being of based on a semi-cylindrical form having a semi-circular cross-section. The top section 14 has a front edge 46 and a back edge 48. The front edge 46 and the back edge 48 extend lengthwise along the half cylinder shape. The top section 14 also has a left side edge 50 and a right side edge 52. The left side edge 50 and the right side edge 52 extend around the semicircular ends of the half cylindrical shape. The edges 46, 48, 50 and 52 may be formed with flanges that project outwardly perpendicular to the outside surface of the top section 14. The flanges facilitate the connection of the bottom section 12 to the top section 14 and the ends 16. However, the flanges are not essential and may be omitted depending on how the top section 12, the bottom section 14 and the ends 16 are connected.

Figure 3:
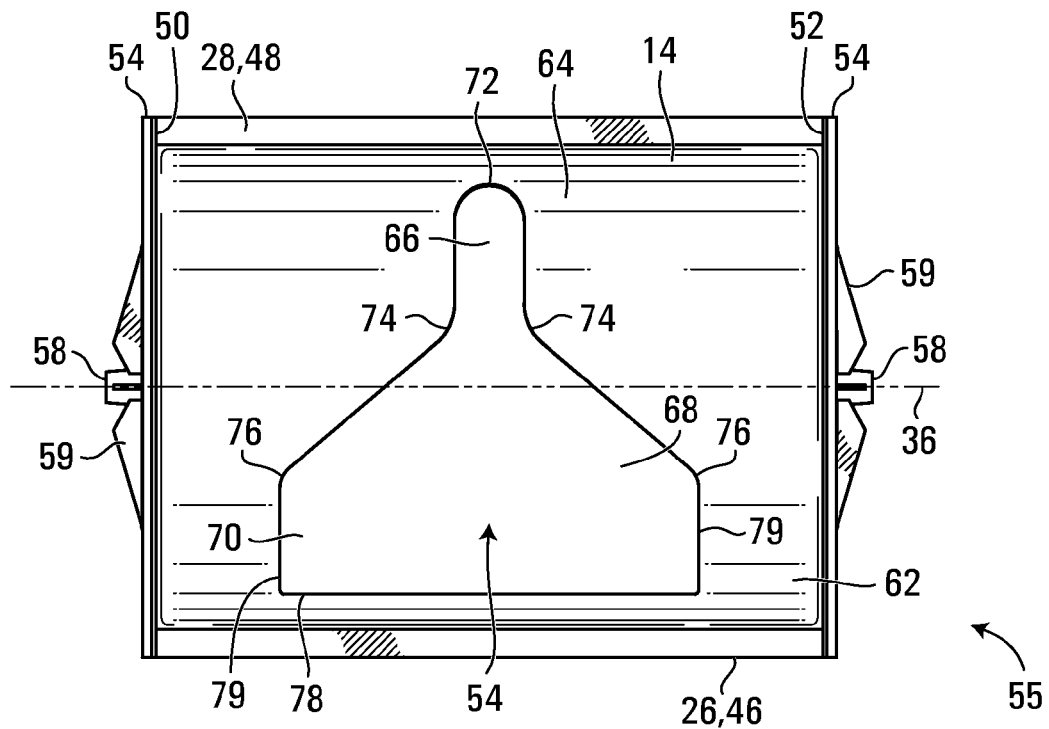
FIG. 3 is a top view of the body of the water dispensing device of FIG. 1.

The top section 14 has an opening 54 to allow water to pour into and out of the water dispensing device 10. The shape of the opening 54 can best be seen from the top view in FIG. 3. FIG. 3 shows the body 55 of the water dispensing device, including the top section 12, the bottom section 14 and the ends 16. The top section 14 has a front section 62 in front of the plane 36 and a back section 64 behind the plane 36.

The opening 54 is symmetrical and centered between the left side edge 50 and the right side edge 52 of the top section 14. The opening 54 is made up of a narrow section 66, a transitional section 68 and a wide section 70. The narrow section 66 is in the back section 64 of the top section 14. The narrow section 66 of this embodiment begins at an opening back 72 and has a narrow elongated shape which is parallel to left side edge 50 and the right side edge 52 of the top section 14. The narrow section 66 ends at an opening first shoulder 74.

The width of the opening 54 gradually increases through the transitional section 68 from the opening first shoulder 74 to an opening second shoulder 76. The width of the transitional section 68 at the opening first shoulder 74 is significantly less than the length of the top section 14 whereas the width of the transitional section 68 at the opening second shoulder 76 is over half of the length of the top section 14. The transitional section 68 extends through the plane 36 from the back section 64 to the front section 62 of the top section 14.

The wide section 70 begins at the opening second shoulder 76. The wide section 70 is wholly within the front section 62 of the top section 14. The wide section 70 has a wide rectangular shape which has edges parallel to the left side edge 50 and the right side edge 52 of the top section 14. The wide section 70 has lower sides 79 and ends at an opening front 78 which is perpendicular to the left side edge 50 and the right side edge 52 of the top section 14. The locations of the opening back 72, the opening first shoulder 74, the opening second shoulder 76 and the opening front 78 relative to the semicircular section are marked on FIG. 4, for reference.

As noted above, the opening 54 allows the water dispensing device 10 to be both filled and emptied. The wide section 70 at the front can allow the water to pour out more quickly as the water dispensing device 10 rotates forward than if there were a narrower opening at the front. In contrast, the narrow section 66 may help enable the water dispensing device 10 to be filled but may slow the empting of the water dispensing device 10 more that a wide opening at the back would.

The shape of the opening 54 may be varied. For example, the opening may simply be rectangular or may be non-symmetrical or of irregular shape. The opening 54 may also be replaced with multiple openings and the filling may be through one opening or several. The opening 54 may not span the plane 36 but may be limited to the front section 62 or the back section 64 of the water dispensing device 10.

Although the shape of the top section 14 of the present embodiment is based on a semi-cylindrical shape, the top section 14 may have other shapes including being non symmetrical or of irregular shape. The top section 14 and the bottom section 12 need not be symmetrical about the plane 38 and the plane 36. Although the present embodiment discloses the top section 14 and the bottom section 12, it will be appreciated that any number of sections may be used, including a single piece.

The bottom section 12, the top section 14 and the ends 16 together form a container body 55 as shown in FIG. 3. The shape of the ends 16 can be seen in FIG. 1. The ends 16 may comprise a flat round plate 56 with a plate opening 57 though the center. In this embodiment, there is a round flange 58 projecting outward around the plate opening 57. There are also a series of six equally spaced ribs 59 extending from the round flange 58 to the perimeter of the round plate 56. As can best be seen in FIG. 3, the ribs 59 of the present embodiment have a roughly truncated triangular shape.

The ribs 59 and the round flange 58 may be used to strengthen the ends 16. However, they may be omitted. The ribs 59 may be replaced with other numbers and shapes of reinforcements. Similarly, the flange 58 may be replaced with another shape of flange or other reinforcement.

The plate opening 57 and the round flange 58 receive the shaft 18. The plate opening 57 and the round flange 58 may seal around the shaft 18 to minimize the release of water through the plate opening 57. The ends 16, and therefore the entire water dispensing device 10, are rotatable about the shaft 18.

The ends 16 are connected and sealed to the bottom section 12 and the top section 14, for example by welding the perimeter of the flat plate 56 to the flanges 52 and 32 on one side and to flanges 50 and 30 on the opposite side. Other means of connecting and sealing may be used including an adhesive or coating. The shape of the ends 16 may be changed from a round shape and the location of the plate opening 57 may be changed from the center of the round plate 56 to match any change in shape of the bottom section 12 and the top section 14.

In this embodiment, the water dispensing device 10 includes the shaft 18 about which the container body 55 is rotatable. However, other means of rotatably supporting the container body 55 may be provided. For example, the shaft 18 may be replaced with rods projecting from the ends 16. The container body 55 may alternative sit on roller bearings.

Figure 2:
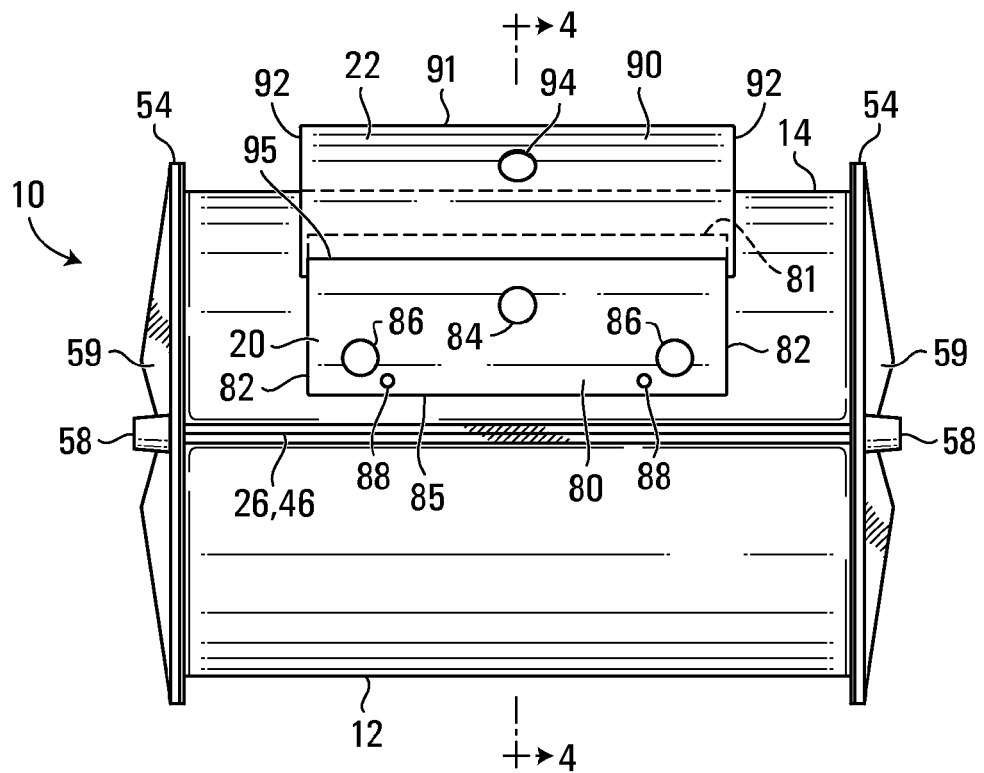
FIG. 2 is a front view of the water dispensing device of FIG. 1.

The water dispensing system 10 also incorporates the lip 20, the lip extension 22 and the weir 24. The positioning and shape of these elements can be seen in FIGS. 1, 2 and 4.

In the present embodiment, the lip 20 has a lip front 80, lip ends 82 a lip upper edge 81 and a lip lower edge 85. The lip 20 has an approximately ¼ cylinder shape. The radius of the cylinder shape of the lip 20 may be substantially smaller than the radius of the cylinder shape of the top section 14. For example, the radius of the lip 20 may be approximately half or less of the radius of the top section 14. The lip 20 also has a number of openings defined through the lip front 80. In this embodiment, referring to FIG. 2, the lip front 80 has an upper lip opening 84, lower lip openings 86 and lip drain openings 88. The upper lip opening 84 and the lower lip openings 86 are round in the present embodiment and are of approximately the same diameter. The upper lip opening 84 is centered along the lip front 80 and is adjacent the upper edge 81 of the lip 20. The lower lip openings 86 are adjacent lip ends 82 and adjacent the lower edge 85 of the lip 20. The lip drain openings 88 are round in the present embodiment and are of substantially smaller diameter than the upper lip opening 84 and the lower lip openings 86. The lip drain openings 88 are also adjacent the lip ends and closer to the lower edge 85 of the lip 20 than the lower lip openings 86.

The lip extension 22 of the present embodiment has an extension front 90 extension ends 92, an upper edge 91 and a lower edge 95. The lip extension has an approximately ¼ cylinder shape. The radius of the cylinder shape of the lip extension 22 in this embodiment is substantially smaller than the radius of the cylinder shape of the lip 20. For example, the radius of the lip extension 22 may be approximately half of the radius of the lip 20. In this embodiment, the lip front 90 has an extension opening 94. The extension opening 94 is round and of approximately the same diameter as the upper lip opening 84 and the lower lip openings 86. The extension opening 94 is centered on the extension front 90 between the upper edge 91, the ends 92 and the lower edge 95.

The lip 20 and the lip extension 22 are of approximately the same length. The lower edge 85 of the lip 20 and the ends 92 of the lip 20 are shaped to match the opening lower sides 79 and the opening front 78 of the opening 54 of the top section 14. The lip 20 is connected to the top section 14 by connecting the lower edge 85 of the lip 20 to the opening front 78 of the opening 54 and the ends 82 of the lip 20 to the opening lower sides 79 of the opening 54. The lip 20 in the present embodiment therefore is centered on and extends along a substantial portion of the top section 14.

Approximately half of the lip extension 22 over laps the lip 20. The lip extension 22 is connected along the ends 92 and along the lower edge 95 to the lip 20. The lip and lip extension need not be symmetrical or symmetrically positioned. Other shapes such as triangular or irregular may be used.

The shape of the weir 24 of the present embodiment can be seen in FIG. 4. The weir 24 is a substantially rectangular rounded plate that has substantially the same curvature as the top section 14 and substantially the same shape as the wide section 70 of the opening 54. The weir 24 is connected to the opening front 78 and to the opening lower sides 79 of the opening 54. The top edge of the weir 24 is spaced slightly below the upper lip opening 84. The positioning of the weir 24 allows water to enter the lip 20 and the lip extension 22 by pouring over the weir 24 without flowing over the ends 82 of the lip 20.

The presence of the weir 24 means that the container 55 defined by the bottom section 12, the top section 14 and the ends 16 must fill to a higher level for water to flow into the lip 20 and the lip extension 22 than if the weir 24 was not present.

It will be appreciated that the height of the weir 24 and the shape of its upper edge can be modified to control when and how quickly water will flow from the container body 55 into the lip 20. For example, the weir 24 may include small openings to allow an amount of water to enter the lip 20 before the water level in the container body 55 reaches the upper edge of the weir 24. The weir may be eliminated or replaced with multiple barriers or other means of blocking or slowing the flow of water from the container body 55 into the lip 20.

The lip 20 and the lip extension 22 have the openings 84, 86, 88 and 94 which allow water to flow out of the lip 20 and the lip extension 22. The rate of flow of water out of the openings 84, 86 and 94 is slower that the rate of flow of water into the lip 20 and the lip extension 22. The result is that the lip 20 and the lip extension 22 gradually fill with water but at a slower rate than if the opening 84, 86, 88 and 94 were not allowing some of the water to drain from the lip 20 and the lip extension 22. Some or all of the openings 84, 86 and 94 may be eliminated, replaced with more or fewer holes of varying diameter and locations as long as the lip 20 and the lip extension 22 can be gradually filled.

Like the plate 34, the lip 20 and lip extension 22 create a weight imbalance as the water dispensing device 10 is filled with water.

The front section 62 of the water dispensing device 10 has a greater volume to be filled with water than the back section 64. The imbalance caused by the plate 34 causes the front of the container body 55 to be heavier that the back of the container body 55 as the container body 55 is filled with water. This main container part accumulates the water first.

A smaller or secondary container part 96 (see FIG. 4) defined by the lip 20 and the lip extension 22 is further from the axis defined by the shaft 18 and contributes further to the imbalance. The imbalance created by the secondary container part 96 is greater than the imbalance would be if the same volume of water was closer to the axis 18.

The smaller container part 96 will contain a weight of water which is not counter balanced by a corresponding weight on the back of the container body 55. The container of the water dispensing device comprises the container body 55 and the smaller container part 96. When the weight of water in the smaller container part 96 becomes sufficient, the weight imbalance will cause the container of the water dispensing device 10 to rotate at least one rotation about the shaft 18.

Although the smaller container part 96 is described as comprising a lip 20 and a lip extension 22, it will be appreciated that other container shapes such as triangular, or irregular may be used. The lip extension 22 allows a larger volume of water to be held in the smaller container part 96 than if the lip extension 22 were not present but it will be appreciated that the lip extension 22 may be omitted. The size and/or shape of the smaller container part 96 may be otherwise varied, and still achieve the required weight imbalance to cause rotation of the water dispensing device 10.

Figure 5:
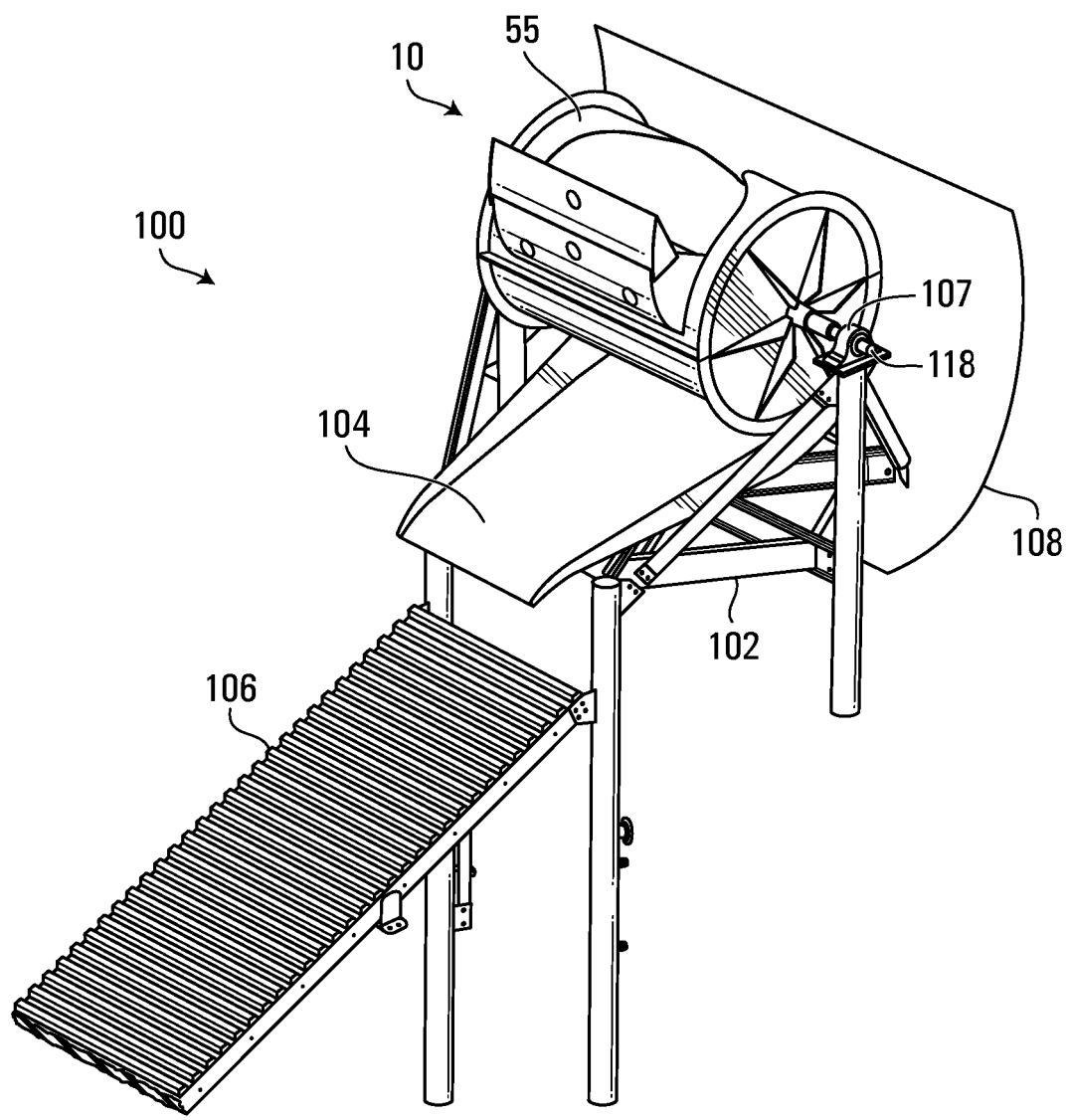
FIG. 5 is a perspective view of a water dispensing system according to the embodiment of FIG. 1.

An embodiment of a participatory water play structure 100 incorporating the water dispensing device 10 is shown in FIG. 5. The participatory water play structure 100 of this embodiment includes the water dispensing device 10, a support structure 102, an upper deflector 104, a lower deflector 106, and a rear deflector 108. The water dispensing device 10 of this embodiment is suspended by the shaft 18 for rotation about an axis defined by the shaft 18. The shaft 18 is, in turn, supported through bearings 107 by the support structure 102. The support structure 102 of this embodiment is a series of elongated members which may be welded or bolted together to provide mechanical support for the water dispensing device 10. The support structure 102 may take other forms known in the art such as being formed by interconnected plates. The support structure 102 allows the water dispensing device 10 to be suspended, for example, above the heads of participants in a water play structure that incorporates the water dispensing device 10.

In this embodiment, the water dispensing device 10 is suspended above an upper deflector 104. The upper defector 104 of this embodiment is angled downward and forward and extends from the back of the water dispensing device 10 forward past the front of the water dispensing device 10. The lower deflector 106 slightly overlaps the upper deflector 104 and also extends forward and downward. The rear deflector 108 in this embodiment is located below the upper deflector 104 and curves behind the water dispensing device 10.

The deflectors 104, 106 and 108 can aid in directing the water which flows out of the water dispensing device 10 forward. The deflectors 104, 106 and 108 may be eliminated or replaced with deflectors of other shapes and locations. For example, the deflectors 104, 106 and 108 may be replaced with a single mushroom top shaped deflector positioned directly below the water dispensing device 10 to deflect the water all around the water dispensing device 10. The deflectors 104, 106 and 108 could also be angled to direct water to the side or behind the water dispensing device 10.

Figure 6:
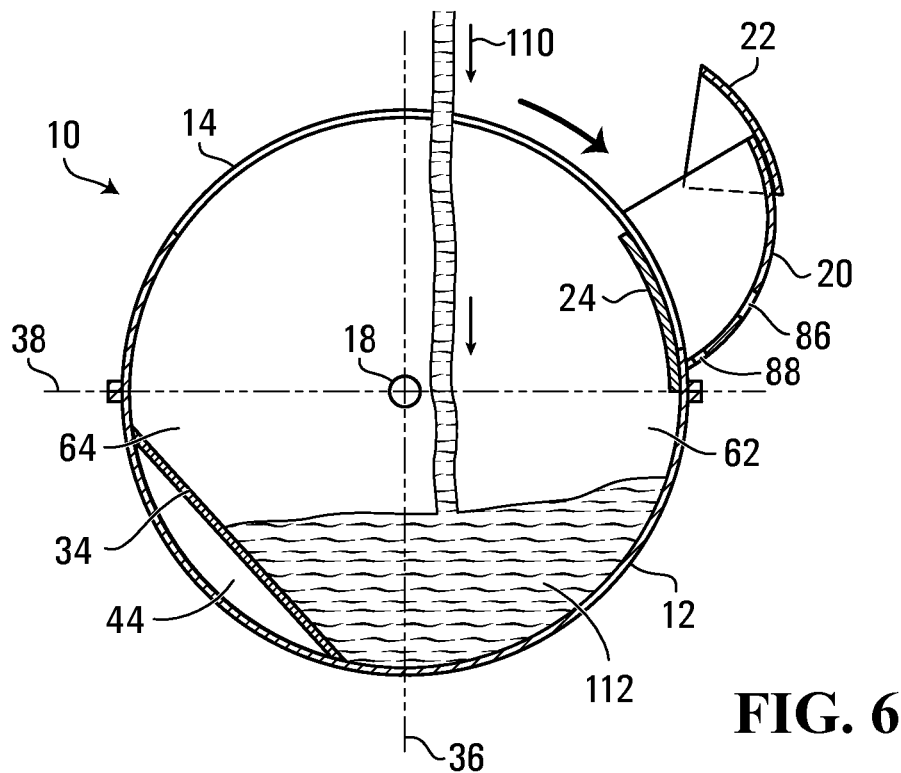
FIGS. 6 to 9 are cross-sectional views of a water dispensing device in a number of operating positions.

FIGS. 6 to 9 depict cross-sectional views of the water dispensing device 10 in operation. In FIG. 6, a stream of water is pouring into the water dispensing device 10 through the opening 54 in the top of the top section 14. The water begins to form a pool of accumulated water 112 in the bottom section 12. The plate 34 blocks water from accumulating in the pocket 44. This means that a greater volume and a greater weight of water will accumulate in front of the shaft 18 than behind the plane 36 through the shaft 18. As the volume of accumulated water 112 increases, the water dispensing device 10 begins to rotate forward around the shaft 18 because of the greater weight of water in the front section 62.

Figure 7:
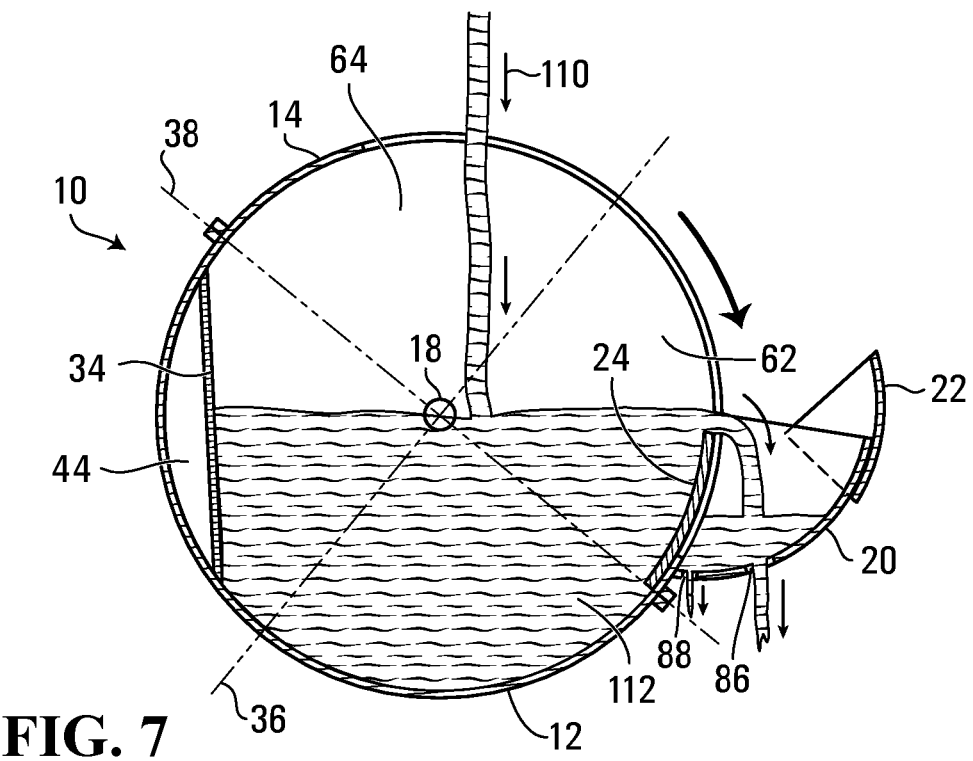

The water dispensing device 10 will eventually rotate to the position depicted in FIG. 7.

In this position, the planes 36 and 38 are no longer vertical. In FIG. 7, the water dispensing device 10 has rotated to the point that the accumulated water 112 begins to pour over the weir 24. The accumulated water then begins to fill the lip 20 and lip extension 22. The filling of the lip 20 and lip extension 22 is delayed by some of the accumulated water starting to pour out through the openings 86 and 88. As the water in the lip 20 and the lip extension 22 continues to rise beyond that depicted in FIG. 7, water may also pour out through the openings 84 and 94. When a predetermined sufficient amount of water has accumulated in the lip 20 and the lip extension 22, the weight imbalance caused by the higher weight in the front section 62 and the lip 20 and lip extension 22 relative to the back section 64 of the water dispensing device 10 will initiate rotation and cause the container to rotate forward in the direction of the arrow in at least one continuous rotation.

Figure 8:
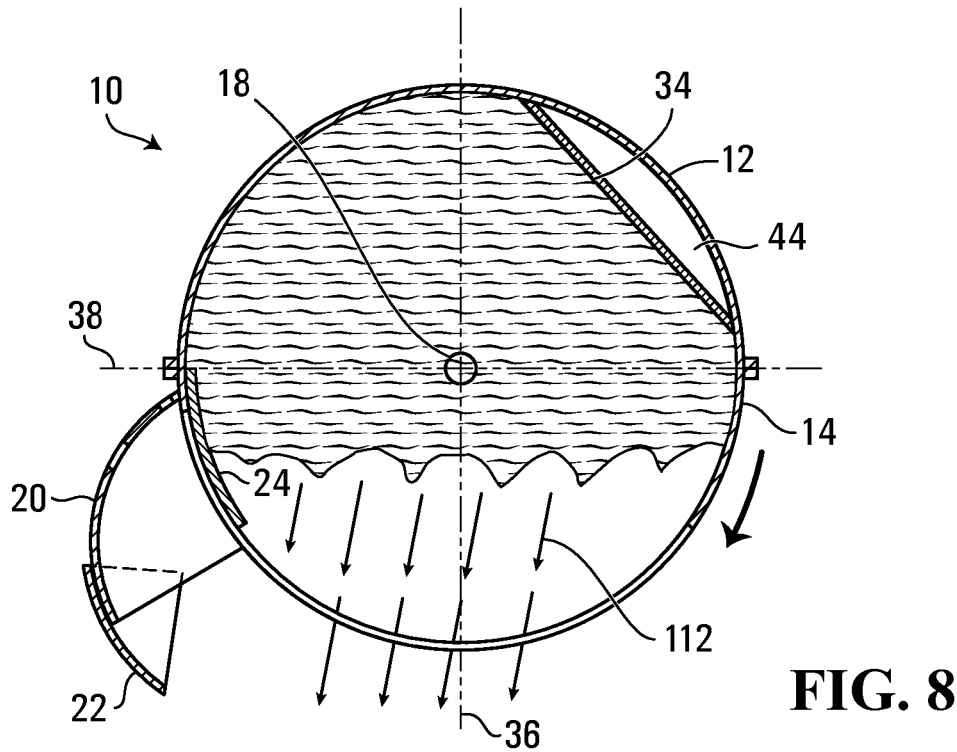

As the water dispensing device 10 rotates so that the opening 54 faces downward, at least a portion of the accumulated water pours out of the water dispensing device 10, as seen, for example in FIG. 8. The water will be poured and may provide a gush or dump of water to participants below or beside the water dispensing device 10.

Figure 9:
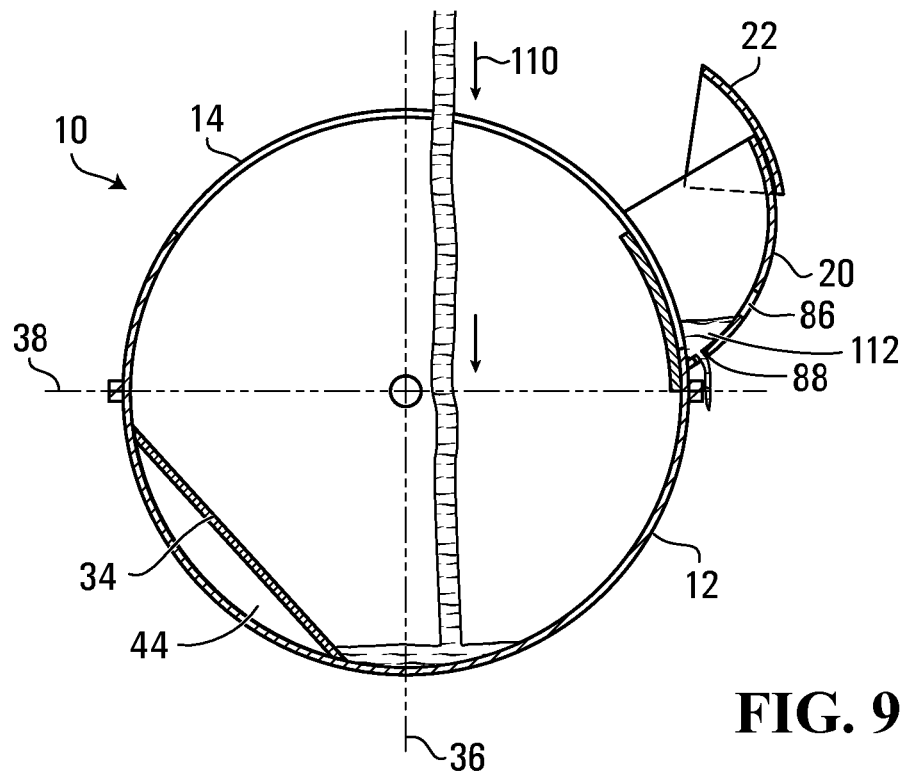

The water dispensing device 10 continues to rotate until it returns to the position depicted in FIG. 9. In this position, substantially all of the accumulated water 112 will have been poured out of the water dispensing device 10. If any water has been retained in the lip 20, it may drain out through the drain holes 88. The stream of water 110 will then flow into the water dispensing device 10 and the cycle may be repeated.

The water dispensing device 10 may range in size from very small, to very large. In one embodiment, the water dispensing device 10 has a length of approximately 78 inches and a diameter of 54 inches such that it can hold approximately 500 gallons of water. The lip may have a radius of 25 inches and the lip extension may have a radius of 16 inches. The plate 34 may have a width of 30 inches. In such an embodiment, depending on the flow rate of the water flow 110, the cycle described above in respect of FIGS. 6 to 10 may take, for example, 4 to 5 minutes to execute. It will be appreciated that the bulk of the time involves the filing of the container body 55, once the water starts to accumulate in the lip 20 and the lip extension 22, the rotation of the water dispensing device 10 may begin in a few seconds and the rotation of the water dispensing device 10 and the pouring out of the accumulated water 112 will occur quickly. This results in a periodic dump of water from the water dispensing device 10.

The size of the container body 55 may also be much smaller, for example 10 gallons and the filling may be faster so that the dispensing may be more frequent. The rate of dispensing may also be affected by changing the size and shape of the block in the rear of the bottom. The manner in which the water is accumulated and dispensed can also be affected by adding upright or curved weirs, baffles or dividers to the inside of the container body 55.

What has been described is merely illustrative of the application of the principles of the invention. Other arrangements and methods can be implemented by those skilled in the art without departing from the spirit and scope of the present invention.

The invention claimed is:

1. A water dispensing device comprising:
    a container mounted to rotate about an axis, the container being adapted to receive and accumulate quantities of water, wherein a plane including the axis divides the unfilled water dispensing device into a front section having a first volume for accumulating water and a back section having a second volume for accumulating water, wherein the first volume is larger than the second volume, and wherein, as the first volume and the second volume accumulate water, the greater quantity of water in the first volume cause rotation of the device;
    the container being pivotal mounted to rotate about the axis such that when the container accumulates more than a predetermined quantity of water, the container is adapted to rotate at least one rotation about the axis to dispense a quantity of water.

2. The water dispensing device of claim 1 wherein the first volume comprises a main container part and a secondary container part spaced further from the axis than the main container part, and wherein the secondary container part is positioned to accumulate water after the main container part has accumulated an amount of water, and wherein the volume of the secondary container is sufficient to cause the complete rotation of the container when a sufficient amount of water is accumulated in the second container part.

3. The water dispensing device of claim 2 wherein the container is cylindrical with the axis comprising a longitudinal axis of the cylinder and the secondary container part comprise a lip projecting out of the cylinder.

4. The water dispensing device of claim 3 wherein the lip is semi-cylindrical.

5. The water dispensing device of claim 2 wherein the container further comprises a barrier between the main container part and the secondary container part wherein the barrier delays when the secondary container part accumulates water.

6. The water dispensing device of claim 5 wherein the secondary container part defines openings to allow limited flow of water from the secondary container part during filling to delay a rate at which the secondary container part accumulates water.

7. The water dispensing device of claim 1 wherein the container comprises a container body which is symmetrical about the plane and the water dispensing device further comprises a blockage wherein a portion of the volume of the container body on the first side of the plane which can be filled with water is less that the portion of the container on the second side of the plane which can be filled with water.

8. The water dispensing device of claim 1 wherein the opening of the container is sized to enable substantially all of the accumulated water to be dispensed when the water dispensing device rotates.

9. The water dispensing device of claim 1 further comprising a deflector below the container angled to direct at least a portion of the dispensed water.

10. A participatory water play system comprising a water dispensing device, the water dispensing device comprising:
    a support structure;
    a container mounted on the support structure to rotate about an axis, the container being adapted to receive and accumulate quantities of water, wherein a first volume of the container for accumulating water on a first side of a plane including the axis is larger than a second volume of the container for accumulating water on a second side of the plane wherein when the first volume and the second volume accumulate a quantity of water, the greater volume of water in the first volume initiates rotation of the device;
    the container being pivotal mounted to rotate about the axis such that when the container accumulates more than a predetermined quantity of water, the container is adapted to rotate at least one rotation about the axis to dispense a quantity of water.

11. The participatory water play system according to claim 10 further comprising a deflector to direct water dispensed from the water dispensing device.

12. The participatory water play system according to claim 10 wherein the support structure supports the container above the heads of the participants.

13. The participatory water play system of claim 10 wherein the water is dispensed periodically at 4 to 5 minute intervals.

14. The participatory water play system of claim 10 wherein the first volume comprises a container part projecting from the container.

15. The participatory water play system of claim 14 wherein the container further comprises a barrier between the container and the container part wherein the barrier delays when the container part accumulates water.

16. The participatory water play system of claim 14 wherein the container part defines openings to allow limited flow of water from the container part during filling to delay a rate at which the container part accumulates water.

17. The participatory water play system of claim 10 wherein the container is symmetrical about the plane and the water dispensing device further comprises a blockage wherein a portion of the volume of the cylinder on the first side of the plane which can be filled with water is less that the portion of the water on the second side of the plane which can be filled with water.

18. The participatory water play system of claim 10 wherein the opening of the container is sized to enable substantially all of the accumulated water to be dispensed when the water dispensing device rotate.

\* \* \* \* \*